Patented Dec. 26, 1933

1,941,403

UNITED STATES PATENT OFFICE 1,941,403

METHOD OF MAKING TILE

Charles B. Lansing and Robert H. Louden, Anderson, Ind., assignors to The National Tile Company, Anderson, Ind., a corporation of Ohio No Drawing. Application November 4, 1931 Serial No. 573,036

9 Claims. (Cl. 25—156)

This invention relates to the process of making glazed tile and its object is to provide a new method of making glazed tile whereby the glaze may be cheaply applied and the finished tile may be made by a single firing operation.

A further object is to provide a new process of making tile which will insure an even distribution of the glazing material over the tile and, if desired, to incorporate some of the glazing material with the body of the tile.

A further general object is to provide a new process for making tile which will insure better tile and provide a cheaper process for making them.

In making glazed tile heretofore it has usually been found necessary to fire the tile twice. In this method it has been the usual practice, when making tile of material in dust form, to compress the dust material containing about ten percent of moisture in a die or mold. The green tile are removed and fired and then a coating of glaze applied and the whole tile fired a second time. Under some circumstances even in the old process the tile was fired only once. In both cases, however, the body of the tile was pressed to form and then the tile was taken out of the mould or die. Then the glazing material was coated upon the face of the finished green tile or the tile was bisque fired and coated with glaze and fired a second time.

This invention consists in applying the glazing material to the tile while the tile still remains in the mold, or just after its ejection from the mold. Following are a few of the possible variations of the process:

I. When making tile out of dust material or material containing a low percentage of moisture, the mould is filled with the dust, then pressed one or more times after which the glazing material is applied to the tile and pressure is applied to the glazing material to press it into the surface of the body of the tile.

The glazing material may be in any one of several states or conditions. For example, the material may be applied in liquid form and may be applied to the body of the tile with or without a binder. When liquid glaze material is used, the tile and glaze are allowed to dry either with or without the application of heat and after drying the tile is ejected from the mould and fired. Under some circumstances the glazing material may be applied in sheet form. These sheets may be made the exact size of the mould in which the tile is to be formed and inserted in the mould and pressure applied to bind the glazing material to the body of the tile or this sheet may be applied to the tile after it is ejected from the mould.

The glazing material may also be made in long strips or sheets of material larger than the die and may be stamped out to size by the die which compresses it into the surface of the tile. The glazing material may be made into such sheets by the addition of such materials as glues, binders, threads, fibers etc. or held on or mixed with various types of papers, textiles etc.

II. The above method may be varied by placing the glazing material in any of its forms on top of the uncompressed dust in the mould and then pressing the tile and pressing the glaze material into the surface of the tile in one operation and pressing any number of times.

III. We may find it advisable under certain circumstances to make a tile in which the glazing material may be pressed more fully through the body of the tile. By this process the dust material is first put in the mold so as to partially fill the mold, then successive layers of a mixture of body dust and glazing material are put in the mold. These successive layers may each contain less of the body dust and more of the glazing material until the upper layer consists of glazing material only. After the mold is filled with the material in the manner described, pressure is applied. This produces a tile, the bottom of which consists of 100 percent body mixture, the face of which consists of 100 percent glazing mixture and of varying percentages of body mixture and glaze mixture between the base and face.

IV. We may find it advisable to use variations of the plastic process in which a plastic blank of clay body is put in the mould then pressed then the glaze material may be applied by any of the processes described in Section I.

In all of these processes the body of the tile is finished and pressed to form a green tile and then is fired in a single firing process. The resulting tile is more compactly formed and more uniformly fired by this process and the material forming the glazed surface and the body of the tile is more thoroughly united. The process not only results in a better product but is also less expensive than the old processes.

It will be obvious to those skilled in the art that various changes may be made in our device without departing from the spirit of the invention and, therefore, we do not limit ourselves to what is described in the specification, but only as indicated by the appended claims.

Having thus fully described our said invention, what we claim as new and desire to secure by Letters Patent, is:

1. The process of making glazed tile which comprises filling or partially filling a mould with body material, applying glaze material in sheet form to the body material, compressing the combined materials, removing the tile from the mould and firing the tile, substantially as set forth.

2. The process of making glazed tile which comprises filling or partially filling a mould with body material, applying glaze material held together with a binder and in sheet form to the body material, compressing the combined materials, removing the tile from the mould and firing the tile, substantially as set forth.

3. The process of making glazed tile which comprises filling or partially filling a mould with body material, applying glaze material with a binding material held on a sheet of paper or textile matter to the body material, compressing the combined materials, removing the tile from the mould and firing the tile, substantially as set forth.

4. The process of making glazed tile which comprises filling or partially filling a mould with body material, then applying glaze material by punching the glaze material from a sheet of glaze material and applying it to the body dust and compressing the body dust all in the same operation, then firing the completed tile, substantially as set forth.

5. The process of making glazed tile which comprises compacting body material in a mould, applying a glazing material in sheet form and compressing it against the body material and then firing the completed tile, substantially as set forth.

6. The process of making glazed tile which comprises compressing body material in a mould, applying glazing material cut in the form of the mould and compressing it against the body material to cause it to cohere therewith to form a green tile, and then firing the completed green tile, substantially as set forth.

7. The process of making glazed tile which comprises forming a tile of body material in a mould, punching glazing material from a sheet of glazing material and applying it to the surface of the body tile in the same operation and then firing the completed tile, substantially as set forth.

8. The process of making glazed tile which comprises partially filling a mould with body material, filling an additional part of the mould with a mixture of body material and glazing material and completing the filling of the mould with glazing material and compressing all of said material in the mould to form a green tile and then firing the completed green tile, substantially as set forth.

9. The process of making glazed tile which comprises partially filling a mould with tile body material, compressing it therein, adding a mixture of body material and glazing material and compressing it against the first compressed material, then adding a glazing mixture and compressing it to the already compressed tile and then firing the completed tile, substantially as set forth.

CHARLES B. LANSING.
ROBERT H. LOUDEN.